United States Patent [19]

Althuber et al.

[11] 4,310,131
[45] Jan. 12, 1982

[54] BRAKING MECHANISM, AS FOR A TAPE RECORDER

[75] Inventors: Horst Althuber; Helmut Prulamp, both of Vienna, Austria

[73] Assignee: U.S. Philips Corporation, New York, N.Y.

[21] Appl. No.: 140,395

[22] Filed: Apr. 14, 1980

Related U.S. Application Data

[63] Continuation of Ser. No. 37,783, May 10, 1979, abandoned.

[30] Foreign Application Priority Data

May 10, 1978 [AT] Austria .................................. 3646/78

[51] Int. Cl.³ .......................... G03B 1/04; G11B 15/32
[52] U.S. Cl. ..................................... 242/204; 242/208
[58] Field of Search ................ 242/204, 208, 210, 201, 242/179, 75.4, 75.5; 360/71–74

[56] References Cited

U.S. PATENT DOCUMENTS

| 3,485,459 | 12/1969 | Osborn | 242/210 |
| 3,545,766 | 12/1970 | Osborn | 242/204 |
| 3,937,422 | 2/1976 | Kato | 242/204 |

FOREIGN PATENT DOCUMENTS

| 2015582 | 12/1971 | Fed. Rep. of Germany | 242/208 |
| 827175 | 3/1960 | United Kingdom | 242/210 |

Primary Examiner—Leonard D. Christian
Attorney, Agent, or Firm—David R. Treacy

[57]     ABSTRACT

A braking mechanism for a tape transportable in opposite directions between two winding hubs, to prevent development of slack. Each hub has an associated brake disc and band, opposite ends of each brake band being connected to arms on different pivotal levers at different lever arm distances, interconnected so that unwinding braking forces are larger than winding braking forces.

5 Claims, 4 Drawing Figures

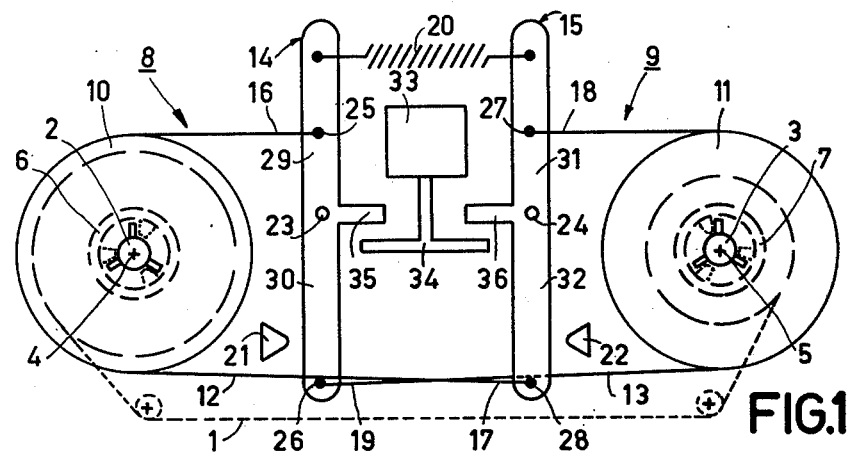
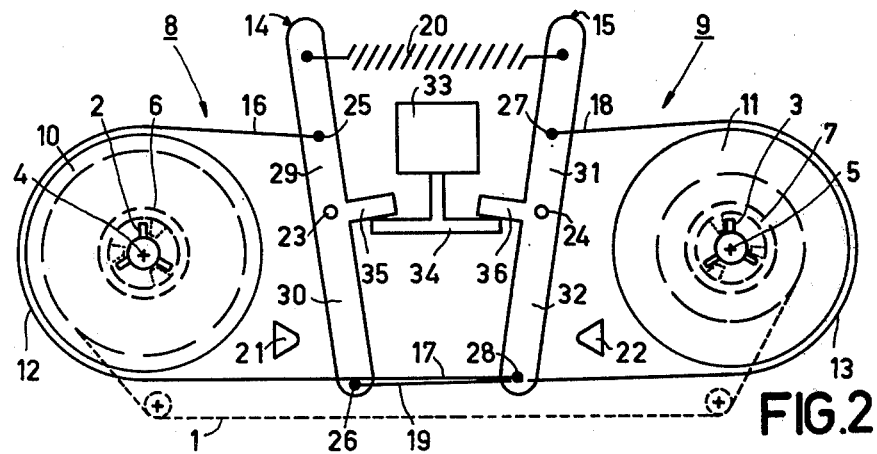
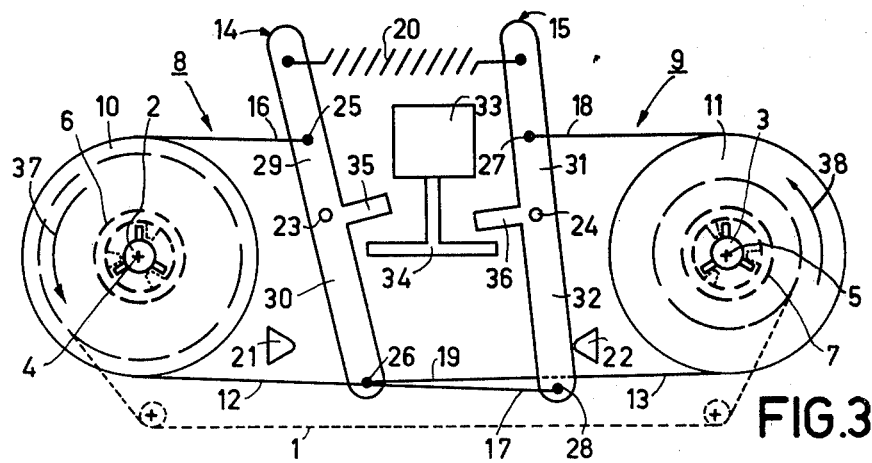

BRAKING MECHANISM, AS FOR A TAPE RECORDER

This is a continuation of application Ser. No. 37,783, filed May 10, 1979 now abandoned.

BACKGROUND OF THE INVENTION

The invention relates to mechanisms for moving a web or a tape in opposite directions between two spools or hubs, having mechanical brakes to prevent slack developing between the hubs; and in particular to a recording and/or reproducing apparatus for a record carrier in the form of a tape which is movable in opposite directions between two rotatable winding hubs, which apparatus comprises two winding spindles for driving the two reel hubs and two braking devices for braking the two reel hubs, which braking devices comprise brake discs which are positively connected to the winding spindles, brake bands which are adapted to engage with the brake discs, and brake levers which are movable in a plane which extends parallel to the base surfaces of the brake discs, and two ends of the brake bands, one of which is pulled and the other is pushed by the brake disc during braking, being connected to the brake levers, resilient means such as a brake spring for biasing each brake lever, under the influence of which spring the brake band is urged against the brake disc during braking, and a stop being provided for each brake lever; which stop limits the movement of the brake lever under the influence of the brake spring acting on said lever. Such an apparatus is known from German Anslegeschrift No. 20 15 582.

In such apparatus it is important to ensure that during each braking operation the record carrier which is moved between the two reel hubs remains sufficiently taut, that the record carrier windings are not slackened and that no loops are formed in the record carrier, because this may lead to incorrect operation, damaging or breakage of the record carrier during subsequent use of the apparatus. In order to obtain such a tensioning of the record carrier the braking action exerted on the hub from which the record carrier is unwound should be greater than the braking action exerted on the reel hub on which the record carrier is wound. If a record carrier is unwound from a reel with a large number of turns and a correspondingly large mass onto a reel with only a few turns and braking is effected, the braking action on the reel hub from which the record carrier is unwound should be a multiple, for example 35 to 50 times, of the braking action exerted on the reel hub onto which the record carrier is wound. Care must then be taken that the record carrier is not subjected to excessive mechanical stress during a braking operation.

SUMMARY OF THE INVENTION

It is an object of the invention to meet the aforementioned requirements in a particularly simple and reliable manner. To this end the apparatus of the type mentioned in the preamble is characterized, according to the invention, in that the brake levers take the form of two-arm levers which are pivotable about pivoting axes which extend parallel to the axes of the brake discs, the arms of said levers having different lengths with respect to the connecting points with the brake bands, that during braking of the reel hub from which the record carrier is unwound the pulled end of the brake band of the braking device for this reel hub is connected to the shorter arm of the brake lever of this braking device, and that the other end of this brake band is connected to the longer arm of the brake lever of the braking device for the other reel hub onto which the record carrier is wound, and that each of those ends of the two brake bands which are pulled during braking causes the lever which is connected to the said end to be pivoted against the action of the brake spring action on this brake lever. In this way only the reel hub from which the record carrier is unwound is braked with a maximum braking action, which is determined by the force of the brake spring, whilst a correspondingly smaller braking action is exerted on the other reel hub, because during braking the brake band is released by the brake disc which is non-positively connected to said winding hub. Thus the braking action on the reel hub from which the record carrier is unwound is greater than that exerted on the other reel hub, is conformity with the aforementioned requirements, so that always perfect braking without slackening or looping of the record carrier is guaranteed. This applies to braking of the record carrier in both directions of transport as well as to standstill of said record carrier, when the two braking devices act with equal strength. This improved braking action is then achieved without addition aids in comparison with the known braking devices of the aforementioned type, which is essential in view of a simple construction.

It has been found to be particularly advantageous when the two brake levers are arranged between the two brake discs and substantially at right angles to the plane which extends through the axes of the two brake discs and when there is provided a common brake spring, which takes the form of a tension spring, for the two brake levers. In this way a particularly simple and reliable construction is obtained. In this respect it is furthermore found to be advantageous when in an apparatus in which the two brake levers are jointly movable by a push rod, each of the two brake levers is provided with a transverse lever which projects from said brake lever near the pivoting axis, the two transverse levers being arranged so as to face each other for the joint actuation of the brake levers by the push rod. Thus, for the actuation of the brakes a construction is obtained which is also extremely simple and compact.

The invention will now be described in detail on the basis of two embodiments shown in the drawings, but to which the invention is not limited.

BRIEF DESCRIPTION OF THE DRAWING

FIG. 1 is a schematic plan view of a braking mechanism for two winding hubs between which a tape is driven.

FIG. 2 shows the apparatus of FIG. 1 with the brake in the released position.

FIG. 3 shows the apparatus of FIG. 1 during a braking operation.

DESCRIPTION OF THE PREFERRED EMBODIMENTS

Figure 4:
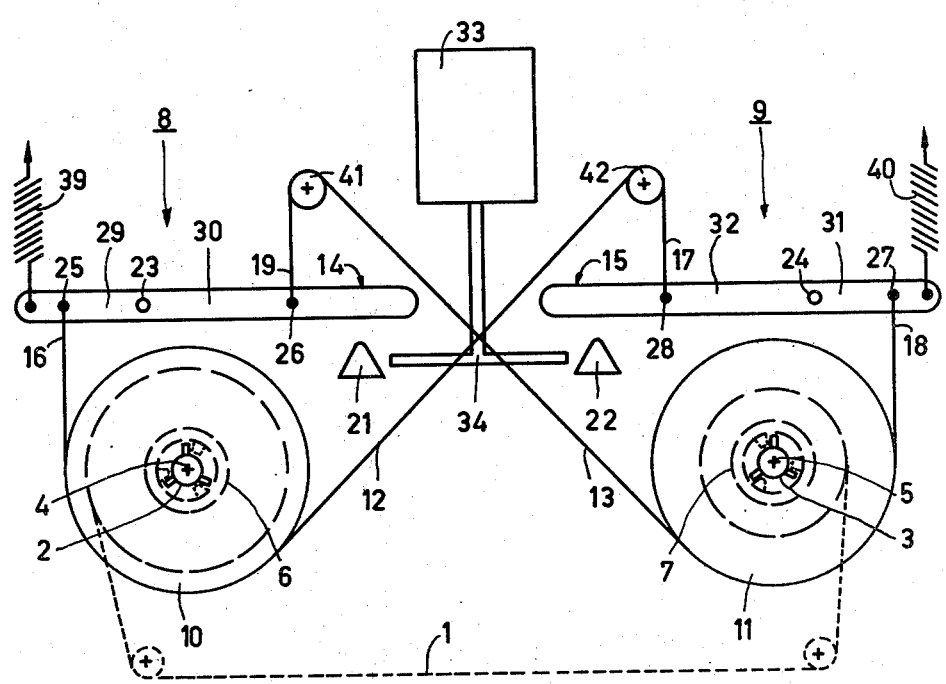
FIG. 4 in plan view and schematically shows those part of a tape recording and/or reproducing apparatus which are essential for the invention, with the brake levers being arranged in line, being in the braked position.

FIGS. 1 to 3 show two winding spindles 2 and 3 of a recording and/or reproducing apparatus for a record carrier 1 in the form of a tape, which in the Figures is symbolically represented by dashed lines. The two winding spindles are rotatable about two axes 4 and 5 in the usual manner, for example by means of a friction wheel drive, a belt drive, by separate motors or the like which are coaxially connected to the winding spindles. Reel hubs 6 and 7, which are also represented by dashed lines, are placed on the windings spindles 2, 3 and can be driven thereby, between which hubs the record carrier 1 can be moved in opposite directions depending on the direction of rotation of the winding spindles. The reel hubs may be provided with flanges in known manner, and thus take the form of reels; however, they may also be accommodated, with or without flanges, in a cassette.

For braking the two reel hubs 6, 7 which cooperate with the winding spindles 2, 3 the apparatus comprises two braking devices 8 and 9, which comprise brake discs 10 and 11 which are coaxially and positively connected to the winding spindles 2, 3, brake bands 12 and 13 which are adapted to engage with the brake discs, and brake levers 14 and 15 which are movable in a plane which extends parallel to the base surfaces of the brake discs. The two ends 16, 17 and 18, 19 of the two brake bands 12, 13, one of which is pulled and the other of which is pushed during braking, are connected to brake levers 14, 15. A brake spring 20 acts on each of the two brake levers 14 and 15, under the influence of which spring the brake band 12 or 13 is kept in engagement with the respective brake disc 10 or 11 during braking. Furthermore, there is provided a stop 21 and 22 respectively for each brake lever 14 and 15, which stops limit the movement of the brake levers 14 and 15 under the influence of the brake spring 20 acting on said levers.

The brake levers 14 and 15 take the form of two-arm levers which are pivotable about pivoting axes 23 and 24, which extend parallel to the axes 4, 5 of the brake discs 10, 11. The lever arms 29, 30 and 31, 32 of the brake levers 14 and 15 respectively have different lengths with respect of the connection points 25, 26, 27 and 28 with the brake bands 12, 13; that is, the points 26 and 28 are spaced from the axes 23 and 24 a greater distance than the points 25 and 27 are spaced from the relevant axes. During braking, as is further apparent from FIGS. 1 to 3, the end 16 or 18 of the brake band 12 or 13 respectively of the braking devices 8, 9 for the relevant winding hub 6 or 7 from which the record carrier 1 is unwound depending on its direction of movement, is connected to the shorter lever arm 29 or 31 of the brake lever 14 or 15 respectively of this braking device and the other end 17 or 19 respectively of the brake band 12 or 13 is connected to the longer arm 32 or 30 of the brake lever 15 or 14 respectively of the braking device 9 or 8 for the other winding hub 7 or 6 on to which the record carrier 1 is wound. The device is then constructed so that each of the ends 16, 19 and 18, 17 of the two brake bands 12 and 13 respectively, which is pulled during braking causes the respective brake lever 14 or 15 connected to said end to pivot against the action of the brake spring 20 which acts on that brake lever.

In the relevant case the two brake levers 14, 15 are arranged between the two brake discs 10 and 11 and substantially at right angles to the plane extending through the axes 4, 5 of the two brake discs 10, 11 and there is provided a common brake spring 20, which takes the form of a tension spring, for the two brake levers 14, 15. For the actuation of the two braking devices 8, 9 there is for example provided an electromagnet 33, shown schematically, which moves a push-rod 34, whose free end is T-shaped and which, in its turn, is adapted to move the two brake levers 14 and 14 jointly. For this purpose each of the two brake levers 14 and 15 is provided with a transverse lever 35 and 36 respectively, which projects from the lever near respective the pivoting axis 23 or 24, the two transverse levers 35 and 36 facing each other, for the joint actuation of the brake levers 14 and 15 by the push-rod 34. In this way the two transverse levers 35, 36 can simultaneously cooperate with the T-shaped end of the push rod 34.

FIG. 1, as previously stated, represents the situation in which the brakes are in the applied position. The electromagnet 33 is then for example not energized. In this situation the two braking devices 8 and 9 ensure that the two winding spindles 2 and 3 are retained with equal braking strength. For releasing these brakes the electromagnet 33 is energized, the push rod 34 being moved so that its T-shaped end pushes against the transverse levers 35, 36 of the two brake levers 14, 15 and moves said levers. As a result of this the two brake levers 14, 15 are moved against the action brake spring 20, the two brake bands 12, 13 being lifted from the two brake discs 10, 11 so that said discs are released for rotation. This situation is shown in FIG. 2. As previously stated, the two winding spindles 2, 3 can now be rotated, the record carrier being moved from the winding hub 6 to the winding hub 7 or vice versa, depending on the direction of rotation of the winding spindles 2, 3.

FIG. 3 shows the situation during braking, assuming that before braking the record carrier 1 moved from winding hub 6 to winding hub 7. The corresponding directions of rotation of the winding spindles 2, 3 and of the brake discs 10, 11 are indicated by the arrows 37 and 38 respectively in FIG. 3.

To initiate braking the electromagnet 33 is restored to its non-energized condition, the push rod 34 returning to the rest position shown in FIGS. 1 and 2, which can be achieved by means of a return spring. The push rod 34, which returns to its rest position, releases the two transverse levers 35 and 36, so that the two brake levers 14 and 15 are pivoted under the influence of the brake spring 20, the two brake bands 12 and 13 engaging with the brake discs 10 and 11. However, as a result of the rotation of the brake discs 10 and 11 to be braked the two brake bands 12 and 13 are moved along owing to the frictional forces acting between said bands and the brake discs 10 and 11. However, this means that the frictional forces move the brake band 12 against the action of the brake spring 20, but the brake band 13 in the direction in which the brake spring 20 acts. This results in a different effect of the brake spring 20 on the brake levers 14 and 15, so that during the braking operation said levers are pivoted to the position shown in FIG. 3.

As it is apparent from FIG. 3, the pivotal movement of the brake lever 15 under the influence of the brake spring 20 is limited by the stop 22 in the present example. As for braking the brake disc 10 the brake band 12 of the braking device 8 fully engages with said disc and remains tensioned, it follows that the paths over which the connection points 25 and 28 between the brake band 12 and the brake levers 14 and 15 move should be the same. However, allowing for the fact that the lever arm 31 of the brake lever 15 is shorter than the lever arm 30 of the brake lever 14, it follows that the connection point 26 between the brake band 13 and the brake lever 14 performs a greater travel than the connection point 27, between the brake band 13 and the brake lever 15.

However, this means that the brake band 13 is released from the brake disc 11 and the braking force exerted on this disc is consequently reduced. Conversely, the brake band 12 fully engages with the brake disc 10, the brake band 12 providing optimum braking of the brake disc 10 with a braking action which is determined by the force of the braking spring 20, because in this situation the brake lever 15 may be regarded as stationary. As soon as the two brake discs 10, 11 come to a standstill, the force of the brake discs on the brake bands being reduced or eliminated, the brake levers 14, 15 can move into the position shown in FIG. 1 under the influence of the brake spring 20 when the brake spring 15 is simultaneously lifted off the stop 22, in which position the two braking devices 8, 9 are in their braked condition and the two brake discs are braked to the same extent. Thus, after braking the winding cannot be slackened or no loops can be formed in the record carrier. However, during braking the reel from which the record carrier is unwound is braked more strongly than the reel onto which the record carrier is wound, which is essential for a perfect braking action. Owing to the symmetrical construction of the two braking devices 8 and 9 it is furthermore guaranteed that a fully analogous braking action is obtained when the record carrier 1 is braked when it moves in the reverse direction, i.e. from reel hub 7 to reel hub 6.

From the foregoing it follows that for specific dimensions of the lever arms 29, 30 and 31, 32, the said slackening of the brake band 13 may be determined by selecting the travel of the connecting points 27 between the brake band 13 and the brake lever 15. However, this travel may also be defined by the stop 22. Suitably, the stop 22 is therefore adjustable, so that the brake band 13 can be released to an arbitrary extent; if desired, it may even be adjusted so that the brake band 13 is completely clear of the brake disc 11. It is obvious that this also applies to the brake lever 14 and the stop 21 which cooperates with said lever.

In this way the invention provides a braking device which in comparison with known constructions of this type is simplified in respect of its construction and actuation, which always ensures that the reel hub from which the record carrier is unwound is braked with a maximum braking action determined by the force of the brake spring, whilst the reel hub onto which the record carrier is wound is only subject to a correspondingly smaller braking action. This always ensures reliable and gentre braking of the record carrier from both directions of transport, the risk of slackening or looping thus being eliminated, also when the record carrier is stationary.

In the embodiment shown in FIG. 4 the brake levers 14 and 15 are arranged in line adjacent the brake discs 10 and 11, a separate brake spring 39 and 40 engaging with the two brake levers. The two brake bands 12 and 13 are passed over guide rollers 41 and 42 before their ends 19 and 17 are connected to the long lever arm 30 and 32 of the brake levers 14 and 15. Thus, it is again ensured that each of the ends 16, 19 and 18, 17 respectively of the two brake bands 12, 13 which is pulled during braking causes the brake lever 14, 15 which is connected to said end to pivot against the action of the brake spring 39 or 40 respectively which engages with said levers. This construction also stands out in respect of its simplicity and reliability.

It is obvious that within the scope of the invention a series of modifications to the embodiments shown are possible. As an example, the angle of contact of the brake bands with the brake discs may be increased, for example to substantially 360°, the brake bands then being passed over various guide rollers. Such a construction has the advantage that the braking action is less dependent on the coefficient of friction between the brake discs and the brake bands because of the greater angle of contact. It is alternatively possible that the stops for the brake levers are constituted by the push rod itself, which then suitably should have an adjustable rest position. In order to define braking actions of different strength it is for example possible to provide several points of attachment for the brake springs on the brake levers. Obviously the brake bands may also be connected to the brake levers via intermediate members.

What is claimed is:

1. A mechanism for moving a tape in opposite directions between two rotatable winding hubs, comprising
    two winding spindle means having respective spindle axes, for driving respective winding hubs, and
    a braking arrangement for braking respective winding hubs, comprising two brake discs, each connected to a respective spindle and rotatable about a respective disc axis; two brake bands, each having two ends and each arranged to operatively engage a respective disc; two brake levers each mounted pivotally about a respective lever pivot axis; means for connecting each end of a brake band to a lever; resilient means for biassing said levers to urge the brake bands against the discs during braking, said resilient means including at least one brake spring; and a stop for each brake lever arranged to limit pivotal movement of the brake lever resulting from the biassing of the lever,
    wherein each brake band has one end connected to one brake lever and the other end connected to the other lever, brake band connection points on the one lever for the two respective brake bands being spaced different distances from the respective lever pivot axis.

2. A mechanism as claimed in claim 1, wherein
    each brake lever has two arms, a first brake band connection point on one arm spaced a first distance from the respective lever pivot axis and a second brake band connection point on the other arm spaced from said respective pivot axis a second distance greater than said first distance,
    one end of a brake band being connected to the first connection point on one lever and the other end of that band being connected to the second point of the other lever, the ends of the other brake band being respectively connected to the second connection point of the one lever and the first point of the other lever, so arranged that during braking of a reel hub from which a tape is being unwound the end of the brake band for that hub connected to a first connection point is the pulled end of that band, and that each end of a brake band pulled during braking urges the lever to which that end is connected in a pivoting direction opposite the biassing of that lever by said resilient means.

3. A mechanism as claimed in claim 2, wherein said spindles and discs rotate about parallel axes, and said lever pivot axes are parallel to the spindle axes, the levers and brake bands moving substantially in a plane perpendicular to said axes.

4. A mechanism as claimed in claim 1 or claim 3, wherein said two brake levers are arranged between the two brake discs, the arms of the brake levers extending substantially perpendicular to a plane through the axes of the two spindles and discs, and said resilient means includes one common tension brake spring only for the two levers.

5. A mechanism as claimed in claim 4 comprising in addition a push rod for moving the two brake levers to disable the braking, wherein each of the brake levers includes a transverse lever arm extending from a location near the brake lever pivoting axis, said transverse levers being arranged to face each other for joint actuation by the push rod.

* * * * *

UNITED STATES PATENT AND TRADEMARK OFFICE
CERTIFICATE OF CORRECTION

PATENT NO. : 4,310,131
DATED : January 12, 1982
INVENTOR(S) : HORST ALTHUBER; HELMUT PRULAMP It is certified that error appears in the above-identified patent and that said Letters Patent are hereby corrected as shown below:

In the Title Page:

The Foreign Application Priority Data should be

--May 19, 1978-

*Signed and Sealed this*

*Third* Day of *August 1982*

[SEAL]

*Attest:*

*Attesting Officer*

GERALD J. MOSSINGHOFF

*Commissioner of Patents and Trademarks*